United States Patent
Simpson et al.

(10) Patent No.: US 10,032,040 B1
(45) Date of Patent: Jul. 24, 2018

(54) SAFE WEB BROWSING USING CONTENT PACKS WITH FEATURED ENTRY POINTS

(71) Applicant: Google Inc., Mountain View, CA (US)

(72) Inventors: Rachel Ilan Simpson, Bavaria (DE); Patrick Louis Maurice Nepper, Bavaria (DE); Jennifer Shien-Ming Chen, San Francisco, CA (US); Pamela Lori Greene, Bavaria (DE); Bernhard K. Bauer, London (GB); Manuel Christian Clement, Felton, CA (US); Wieland Holfelder, Bavaria (DE); Juin-Kai Chou, Bavaria (DE); Sergiu Iordache, Bavaria (DE); Hagen Fritsch, Bavaria (DE); Markus Heintz, Bavaria (DE); Roma Rajni Shah, San Francisco, CA (US)

(73) Assignee: Google LLC, Mountain View, CA (US)

( * ) Notice: Subject to any disclaimer, the term of this patent is extended or adjusted under 35 U.S.C. 154(b) by 795 days.

(21) Appl. No.: 14/311,202

(22) Filed: Jun. 20, 2014

(51) Int. Cl.
*G06F 21/30* (2013.01)
*G06F 21/62* (2013.01)
*G06F 21/10* (2013.01)
*H04L 29/06* (2006.01)

(52) U.S. Cl.
CPC .......... *G06F 21/6218* (2013.01); *G06F 21/10* (2013.01); *H04L 63/0245* (2013.01); *H04L 63/0876* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,571,325 B1 | 8/2009 | Cooley et al. | |
| 7,853,535 B2 | 12/2010 | Colella | |
| 8,490,176 B2 | 7/2013 | Book et al. | |
| 2002/0095415 A1* | 7/2002 | Walker | G06F 17/30867 |
| 2004/0006621 A1* | 1/2004 | Bellinson | G06F 17/30867 709/225 |
| 2007/0067297 A1* | 3/2007 | Kublickis | G06Q 30/02 |
| 2007/0180488 A1* | 8/2007 | Walter | H04N 5/783 725/135 |
| 2008/0307339 A1 | 12/2008 | Boro et al. | |

(Continued)

FOREIGN PATENT DOCUMENTS

WO WO-2012/129596 A1 10/2012
WO WO-2013/055564 A1 4/2013

*Primary Examiner* — Fatoumata Traore
(74) *Attorney, Agent, or Firm* — McDermott Will & Emery LLP

(57) ABSTRACT

Content packs are provided for identifying a plurality of authorized web-based resources, wherein a web browser is configured to prevent access to web-based resources not identified by content packs installed in the web browser. Accordingly one or more of content packs are selected and installed in the web browser, and one or more featured resources are identified from a plurality of authorized web-based resources provided by the installed content packs. An account access page provided by the web browser is automatically configured with one or more access links corresponding to the one or more featured resources, with each featured resource providing a web-based entry point to one or more web-based resources made available by the installed one or more content packs.

21 Claims, 5 Drawing Sheets

(56) References Cited

U.S. PATENT DOCUMENTS

| | | | |
|---|---|---|---|
| 2009/0271707 A1* | 10/2009 | Lin | G06F 17/30893 |
| | | | 715/738 |
| 2011/0302633 A1* | 12/2011 | Windschauer | G06F 17/30867 |
| | | | 726/4 |
| 2012/0054313 A1* | 3/2012 | Williams | G06F 17/30902 |
| | | | 709/219 |
| 2012/0216251 A1 | 8/2012 | Kumar et al. | |
| 2012/0254042 A1 | 10/2012 | Ludemann | |
| 2012/0324568 A1 | 12/2012 | Wyatt et al. | |
| 2013/0346268 A1 | 12/2013 | Pereira et al. | |

* cited by examiner

SAFE WEB BROWSING USING CONTENT PACKS WITH FEATURED ENTRY POINTS

BACKGROUND

The Internet provides many applications and learning tools for educational resources. However, guardians (e.g., employers or parents) are concerned with the ease at which unsuitable content may also be accessed when a supervised user's use of the Internet is not supervised. Accordingly, technologies have been developed for creating a safe and controlled online environment by way of predetermined access controls set by the guardian. In this regard, some products allow a guardian, in the role of an account manager, to filter content manually or by topic. Manual filtering, however, may be time consuming and it may be difficult to envision every website that may be suitable for a particular supervised user. Filtering by topic requires guardians to make decisions about contentious grey areas, for example what category a particular piece of content should be placed into and/or how appropriate the content would be to a supervised user. Some websites have incorporated rating systems. However, there are multiple rating systems used on the Internet, each arguably based on a subjective standard, and most websites on the Internet remain unrated.

SUMMARY

The subject technology provides a system and computer-implemented method for installing one or more of content packs in a web browser operating on a computing device, a content pack identifying a plurality of authorized web-based resources, the web browser being configured to prevent access to web-based resources not identified by content packs installed in the web browser, identifying one or more featured resources from the plurality of authorized web-based resources, and automatically configuring an account access page provided by the web browser with one or more access links corresponding to the one or more featured resources, each featured resource providing a web-based entry point to one or more web-based resources made available by the installed one or more content packs. Other aspects include corresponding systems, apparatuses, and computer program products for implementation of the computer-implemented method.

In various aspects, a computer program product tangibly embodied in a computer-readable storage device comprises instructions that, when executed by a computing device, cause a computing device to identify the one or more content packs from a web-based application repository based on predetermined access controls, install the one or more of content packs in a web browser operating on the computing device, a content pack identifying a plurality of authorized web-based resources, the web browser being configured to prevent access to web-based resources not identified by content packs installed in the web browser, identify one or more featured resources from the plurality of authorized web-based resources; and automatically configure an account access page provided by the web browser to display one or more access links corresponding to the one or more featured resources, each featured resource providing a web-based entry point to one or more web-based resources made available by the installed one or more content packs. Other aspects include corresponding systems, apparatuses, and computer program products for implementation of the machine-readable medium.

In further aspects, a system may include one or more processors and a memory. The memory may include instructions that, when executed by the one or more processors, cause the one or more processors to facilitate the steps of install a content pack in a web browser operating on the computing device, the content pack identifying a plurality of authorized web-based resources, the web browser being configured to prevent access to web-based resources not identified by content packs installed in the web browser, identify one or more featured resources from the plurality of authorized web-based resources based on a descriptor tag identified in the content pack and associated with one or more of the web-based resources, and automatically configure an account access page to display one or more access links corresponding to the one or more featured resources, each featured resource providing an entry point to one or more web-based resources made available by the installed one or more content packs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
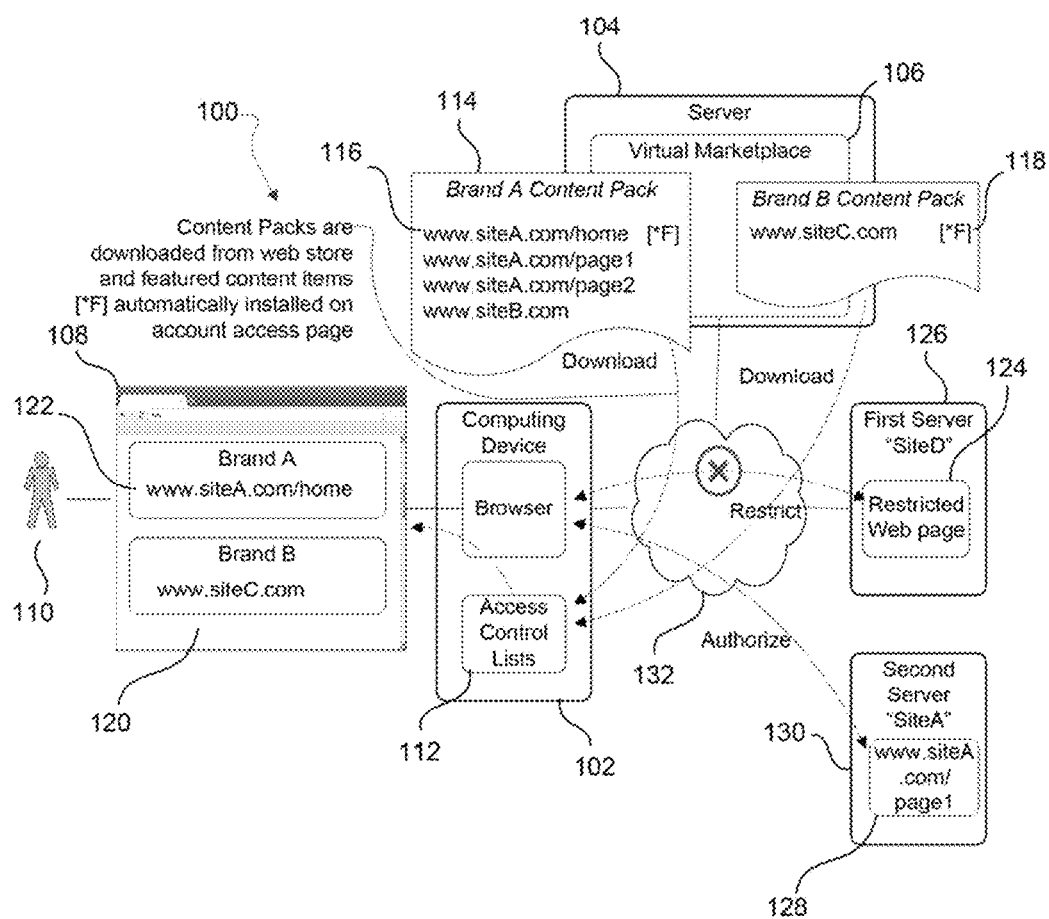
FIG. 1 depicts example data flows related to a system for automatically providing a safe browsing environment for a supervised user.

FIG. 1 depicts example data flows related to a system 100 for automatically providing a safe browsing environment for a supervised user according to various aspects of the subject technology. System 100 may include one or more of a computing device 102 and a server 104 which hosts a virtual marketplace 106. In various aspects, system 100 may include one or more processors and a memory including instructions that, when executed by the one or more processors, cause the one or more processors to facilitate various processes to carry out one or more of the features described herein.

In one or more implementations, computing device 102 may include such devices as a laptop or notebook computer, tablet computer, smart phone, personal data assistant, augmented-reality glasses, touch screen or television with one or more processors embedded therein or coupled thereto, or any other sort of electronic device with the ability to process executable instructions and data. Server 104 may be representative of a single computing device or group of computing devices, including web servers and/or databases, configured, for example, to deliver web content that can be accessed through the internet. Server 104 may be operably connected to an account management server or software to provide authentication and authorization services to computing devices that access resources provided by server 104.

In various implementations, computing device 102 is configured to provide a web browser 108. Web browser 108 is used, for example by a user 110 of computing device 102, to access resources and content made available by web servers and other devices made available to computing device 102 over a network. According to various examples herein, user 110 is a "supervised user." In this regard, web browser 108 is configured, by an account manager (e.g., a guardian), with predetermined access controls to prevent access to web-based resources unsuitable for supervised user 110. Accordingly, web browser 108 may be configured to prevent access to resources not associated with access control lists 112 pre-installed in the web browser.

Web browser 108 (and/or computing device 102) may be configured for access by users having different levels of access privileges, with the authorized account manager having higher access privileges than supervised user 110. In some implementations, access privileges are determined by access controls. For example, web browser 108 may be configured by the account manager with certain access controls for each user of web browser 108. For example, the account manager may configure web browser 108 with a set of access controls customized for supervised user 110. When supervised user 110 uses web browser 108, the supervised user is prevented from accessing websites, content, and configuration settings not allowed by the access controls corresponding to the supervised user's account. Access control list 112 may be part of or associated with access controls set for supervised user 110.

Server 104 is configured to provide a web-based software repository, or virtual marketplace 106. Virtual marketplace 106 implements web-accessible interface (e.g., an online store) that allows consumers to, among other things, browse and download software items, including web applications, browser extensions, and/or mobile applications to compatible browsing devices, such as computing device 102. The downloadable software items may be installed into web browser 108 or, in some implementations, installed locally to computing device 102 and used or accessed by web browser 108.

In various aspects, virtual marketplace 106 provides bundled access lists in the form of content packs 114. Each content pack 114 includes a listing (e.g., a whitelist) of content items 116 such as URLs, URL patterns, domain names, top-level domain names, hostnames, IP addresses, and/or web applications and/or browser extensions. As will be described further, content items 116 of a content pack 114 may all be associated with a single brand entity, website, or predetermined user experience or theme. Accordingly, when a content pack 114 is downloaded and installed in a web browser, the web browser is configured to allow access to web-based resources corresponding to the content items provided by the content pack. One or more of content items 116 may further be designated as "featured items" 118 (e.g., designated by "[*F]" in FIG. 1) that provide entry points for access to one or more web-based resources authorized or otherwise made available by the listing of content items provided by the installed content pack.

Content packs 114 are downloaded and installed in web browser 108 under the control of an authorized account manager for computing device 102. When web browser 108 navigates to virtual marketplace 106, one or more content packs 114 consistent with predetermined account permission settings in web browser 106 may be identified within the web store. For example, if supervised user 110 is using the browser to navigate to virtual marketplace 104 then the account permission settings associated with the supervised user's account are used to identify content packs 114. In another example, if the account manager navigates to virtual marketplace 106 then content packs 114 may be identified and displayed grouped according account permission settings for the user accounts that the account manager manages.

In one example, supervised user 110, using web browser 108, may navigate to virtual marketplace 106 and select one or more of identified content packs 114 for installation. In some implementations, supervised user 110 may access a listing of content packs 114 that are not approved by the account permission settings associated with the supervised user's account. In order to install one of these content packs, virtual marketplace 106 may provide an interface for requesting permission to install content packs which are otherwise not available for installation under the user's access permission settings. Accordingly, supervised user 110 may issue a request via the interface for permission to install the content pack to the account manager, and the request may then be sent to the account manager. Additionally or in the alternative, the account manager may choose to install content packs 114 from virtual marketplace 106 for a supervised user.

Accordingly, the account manager may sign into virtual marketplace 106, view requests initiated by supervised users, and select appropriate ones of the identified content packs 114 for download and installation into web browser 108. Selected content packs 114 may then be automatically installed into the supervised user's web browser. In some implementations, web browser 108 is aware of the requests for certain content packs 114 and, on startup and/or at periodic intervals, queries virtual marketplace to determine whether the content packs have been authorized for download and installation by the account manager. In some implementations, the selected content packs 114 are pushed to web browser 108 when web browser 108 is determined by virtual marketplace 106 to be online and available for downloading of the content packs. Once a content pack 114 is installed in web browser 108, the web browser is automatically configured to authorize access to the web-based resources associated with content items provided by the installed content pack.

According to the subject technology, web browser 108 may be configured with an account access page 120 that displays entry points 122 for accessing web-based resources authorized by content packs 114 installed in web browser 108. These entry points are based on featured items 118 provided by content packs 114 installed in web browser 108. For example, during an installation of a content pack 114, one or more featured items 118 provided by the content pack are identified, and account access page 120 is automatically configured with the featured items to create a home page of entry points to web-based resources authorized by the presently installed content pack and/or previously installed content packs. Entry points 122 may be organized on the account access page by groups 124, for example, according to a specific brand and/or content pack. Each group 124 may be displayed in a different section or panel of account access page 120, and may include one or multiple entry points 122 associated with a single brand.

Account access page 120 may be provided by web browser 108, for example, from a local file on computing device 102 or from a remote server location (e.g., a website associated with the user's account). Additionally or in the alternative, account access page may be provided outside the browser. For example, a separate user interface accessible through the system tray of an operating system of computing device 102 may provide a selectable representation for launching one or more entry points 122 or launching of an application that includes account access page 120 for selecting one or more entry points 122. In other examples, one or more entry points 122 may be surfaced as individual icons on a mobile operating system homescreen, operating system desktop, or the like. In this manner, account access page 120 may be a grouping of one or more of these icons on the home screen or desktop.

In various aspects, a content pack 114 related to a brand may include multiple authorized URLs for accessing content on the brand's website, and/or URL patterns that match a multiple URLs. Content pack 114 may further include one or more entry point URLs for accessing the authorized URLs. The entry point URL may be displayed on account access page 120 in connection with the brand or together with other entry point URLs provided by other content packs to provide an easy way for a supervised user to gain access to the resources authorized by the content packs installed in web browser 108.

As explained previously, each content pack 114 includes a listing (e.g., a whitelist) of content items 116. This listing contributes to one or more access control list 112 installed in web browser 108. In various implementations, access control list 112 forms a portion of the overall access permission settings for web browser 108 and informs web browser 108 as to which web-based resources may accessible to a user of web browser 108, when operating under the access permission settings. In this regard, web browser 108 is effectively blocked from accessing resources not designated or otherwise identified by access control list 112.

In the depicted example, web browser 108 downloads and installs content packs 114 for "Brand A" and "Brand B." Brand A Content Pack designates www.siteA.com/home as a featured item 118, and Brand B Content Pack designates www.siteC.com as a featured item 118. Accordingly, access control list 112 is automatically populated with content items 116 of both content packs, and account access page 120 is automatically configured with featured items 118, grouped according to the corresponding brands. Supervised user 110 may then attempt to access a restricted web page 124 located on a first server 126 hosting "Site D." Because a content item for web page 124 has not been installed in access control list 112, web browser 108 is prevented from accessing restricted web page 124. On the other hand, because content item www.siteA.com/page1 corresponding to web page 128 was part of the Brand A Content Pack, now installed on web browser 108, supervised user 110 is authorized to access web page 128 located on a second server 130 hosting "Site A."

In the depicted example, a computing device 102 and server 104, and first server 126 and second server 130 are operably connected over one or more networks. For example, computing device 102 may be connected to server 104 by a network 132. Network 132 may be a WAN, LAN, or any other network consisting of one or multiple networking technologies (such as satellite, cellular, cable. DSL, optical network, Ethernet over twisted pairs, and others), and which deploys one or multiple networking protocols for transferring data. Network 132 may also include, but is not limited to, any one or more of the following network topologies, including a bus network, a star network, a ring network, a mesh network, a star-bus network, a tree or hierarchical network, and the like. In some implementations, network 132 may also be a wireless area network (e.g., 802.11, Bluetooth, infrared, Wireless USB, and the like).

Figure 2:
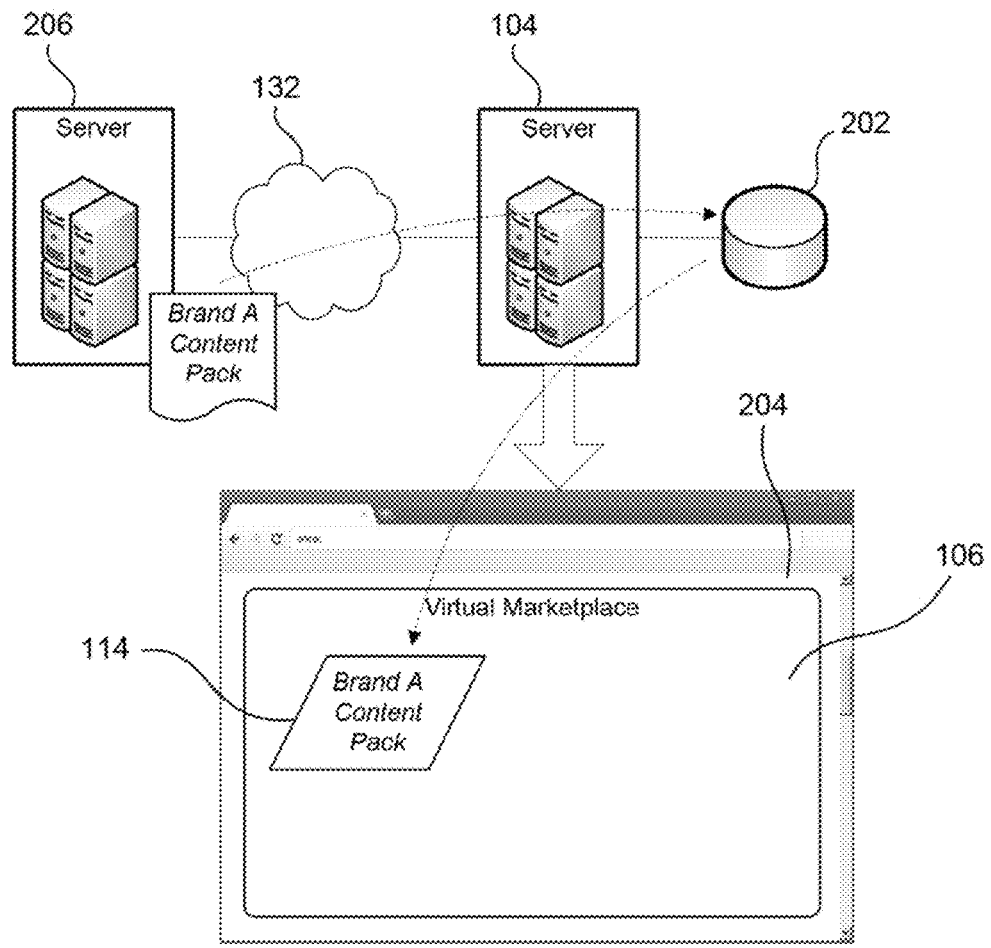
FIG. 2 depicts a server and database for providing a web-accessible interface for delivery of content packs to computing devices.

FIG. 2 depicts a server 104 and database 202 for providing a web-accessible interface 204 for delivery of content packs to computing devices according to one or more aspects of the subject technology. Server 104 may include, for example, server 104 and one or more databases 202, which collectively may provide web-accessible interface 204. Web-accessible interface 204 further provides a virtual marketplace 106 that allows consumers to, among other things, browse and download software items, including web applications, browser extensions, and/or mobile applications to compatible browsing devices, such as computing device 102.

Server 104 may allow a content provider (or brand) to install, upload or otherwise provision content packs 114 along with billing options to a user, and server 104 may provide functionality to facilitate a launch of, provide or otherwise deploy content packs 114. Server 104 may allow the content provider to focus resources on the development of content and content packs, and rely on server 104 to provision all functionality and resources necessary to deploy the content packs to end users. Once a content provider creates a content pack 114, the server 104 allows the provider to provide accounting options on how to bill for download or usage of the content pack, if desired. Server 104 may then handle all other functionality associated with deploying and maintaining content packs 114. In some aspects, server 104 may be associated with, maintained by, or managed by the content provider.

Server 104 may, for example, provide virtual marketplace 106 where content packs provided by a content provider and uploaded or provided to the server may be downloaded (and/or purchased) by end-user consumers. Server 104 may also provide server functionality to support the download and/or operation and usage of the application by the consumers. The server functionality may be configured by the content provider or by a server administrator. Server 104 may also log the number of downloads of a content pack and/or the number of end-users who have requested a download of or who have downloaded the content pack.

Server 104 may be accessible by a computing device 102, for example, on which a client-side application is installed. The client-side application communicates with server 104 to download and install content packs 114 onto computing device 102. The client-side application may include any application or service that may be configured to operate on or with computing device 102. Server 104 may include an application engine for communicating with computing device 102 using the client-side application installed on computing device 102. In one or more implementations, the client-side application may include an integrated mobile application that is configured to communicate with server 104 over network 132. The client-side application may include an application and/or a webpage, or, for example, may include an application built to operate on or as a wrapper to a mobile web browser and/or an HTML application. In one example, the client-side application may be accessible to computing device 102 through web browser 108.

According to various aspects, a content provider may develop a content pack 114, for example, on a content provider server 206, upload it to server 104, and server 104 may deploy content pack 114, for example, to computing device 102. In this regard, server 104 may provide the content pack 114 to web-accessible interface 204 where it is displayed to end-users via virtual marketplace 106. Web-accessible interface 204 may include any web-based interface or webpage in which the content pack may be downloaded by an authorized user (e.g., an account manager or supervised user 110).

An account manager or supervised user 110 may access interface 204 and search virtual marketplace 106 for content packs 114, for example, using computing device 102. Upon identifying one or more content packs 114 in virtual marketplace 106, a content pack request and identification information may be sent from computing device 102 to virtual marketplace 106 and/or server 104. Server 104 may bill an account associated with computing device 102 (and/or its account manager or supervised user 110) for selected content packs.

Virtual marketplace 106 may further provide provisioning functionality for content provider, in that the virtual marketplace 106 may determine which users are authorized to use content packs 114 and determine which type of content packs 114, if any, computing device 102 is authorized to download and/or install. Once a content pack 114 is provided to computing device 102, server 104 may update database 202 (including, for example, database entries for registered users, accounting, and/or usage) in connection with the downloading of the selected content pack(s) and so that, optionally, the user may be billed for the download and/or installation.

An authentication engine may authenticate and/or authorize requests for content packs, and an accounting engine may perform accounting and/or billing based on a downloading and/or installation of the content packs. The authorization engine may, for example, determine whether the request is authorized by an account manager associated with computing device 102. The authorization engine may compare the identification information received with the request for the content pack, and type of the content pack against information stored in database 202. Database 202 may include information indicating which users and/or computing devices (e.g., based on the identification information) are authorized to download and/or install the selected content packs. Accounting options associated with pricing for the download and/or installation of content packs 114 may be stored in database 202. For example, the content provider may elect a one-time charge to download the content pack, a subscription service, a charge for using particular features (e.g., content items) of content pack 114, a trial period, tiered pricing and/or any other combination of pricing models the content provider desires.

In the depicted example, one or more content packs 114 are uploaded by a content provider over network 132 to server 104, where the one or more content packs 114 are stored in database 202 and made available on virtual marketplace 106 by web-accessible interface 204. The one or more content packs 114 originate or are provided from content provider server 206, which is associated with "Brand A." Accordingly, the content packs provided by content provider server 206 may be displayed for selection by end-users within virtual marketplace 106 with other content made available by server 104 for Brand A. Web-accessible interface 204 may further include functionality locating content packs based on a query for a type of content pack or for content packs associated with a particular brand. In this regard, a search for "Brand A" may return the display of content packs 114 associated with Brand A.

Figure 3:
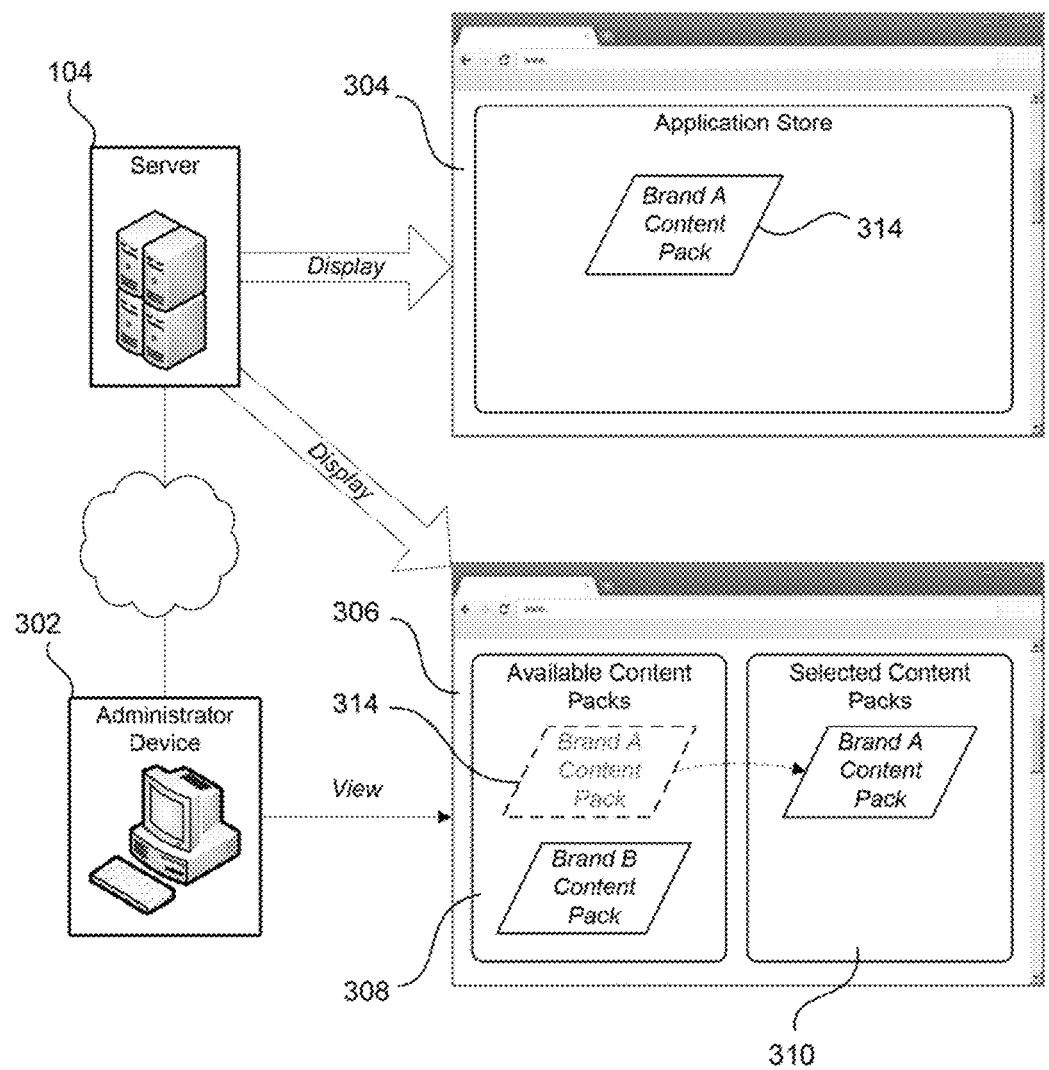
FIG. 3 depicts selection of content packs by an account manager for download and installation on a computing device associated with a supervised user.

FIG. 3 depicts selection of content packs by an account manager for download and installation on a computing device associated with a supervised user according to one or more aspects of the subject technology. In general, server 104 permits an account manager to readily identify and group content packs that should be made available to supervised users when those users log-into virtual marketplace 106. The supervised user(s) may then view the identified and/or grouped content packs when logged in to server 104 (or virtual marketplace 106) using credentials that have been associated with the supervised user(s) and the account manager (e.g., logged in using an e-mail previously identified as being associated with the account manager).

In the depicted example, an account manager uses an administrator device 302 to communicate with server 104 over network 132. In general, computing device 102 and administrator device 302 are multi-purpose computing devices, used by supervised user 110 and an account manager associated with supervised user 110, respectively, to serve personal or professional needs. Server 104 is a computing system that implements an online software store that allows consumers to, among other things, browse and download content packs and other applications to compatible computing devices, such as the computing device 102. Server 104 displays a virtual marketplace 106, which includes a first interface 304 for providing content packs for identification, selection, download, and installation onto end-user computing devices (e.g., computing device 102), and a second interface 306 for management of content pack selections for the end-user computing devices. First interface 304 may be displayed, for example, to all users, including account managers and supervised users, while second interface may be displayed, for example, only to account managers.

Server 104 may be configured to provide second interface 306 to administrator device 302, on a successful authentication by an account manager. In this regard, second interface 306 enables an account manager to identify and select content packs for recommendation or requirement to supervised user 110, for installation on computing device 102. In one or more implementations, the account manager may be associated with an organization, and server 104 may allow the organization to manage applications installed on computing devices for end-users associated with the organization, for example, employees, without any configuration or set-up required by the employees.

In the depicted example, second interface 306 includes a first pane 308 and a second pane 310. Each pane may be an area on a web page that acts as a visual container for a group of items, for example, applications, content packs, and other downloadable software-based items. First pane 308 may display available content packs 114 arranged, for example, according to brand. Second pane 310 may be associated with a particular supervised user, for example, supervised user 110. In this regard, second interface 306 may include multiple second panes 310, one or more for each supervised user managed by the account manager logged onto virtual marketplace 106. Accordingly, an account manager accessing second interface 306 via administrator device 302 may search for content packs 114 displayed in first pane 308, and then select certain content packs 114 for a supervised user by moving selected content packs from first pane 308 to second pane 310. In one or more implementations, content packs may be selected for a supervised user by selection of a check box or other selection indicator associated with the content packs. In one example, selecting the content packs highlights the content pack for selection. The account manager may then confirm the selection, causing the selected content packs to be moved to second pane 310. In some implementations, content packs may be moved, for example, by way of a "drag and drop" operation.

By an account manager's selection of content packs for a supervised user, or by placement of a content pack in a second pane 310 associated with supervised user 110, the supervised user is allowed to download the content pack. Accordingly, upon selection by the account manager, a content pack will automatically appear in first interface 304 for display to supervised user 110 when supervised user 110 uses web browser 108 to navigate to virtual marketplace 106.

Figure 4:
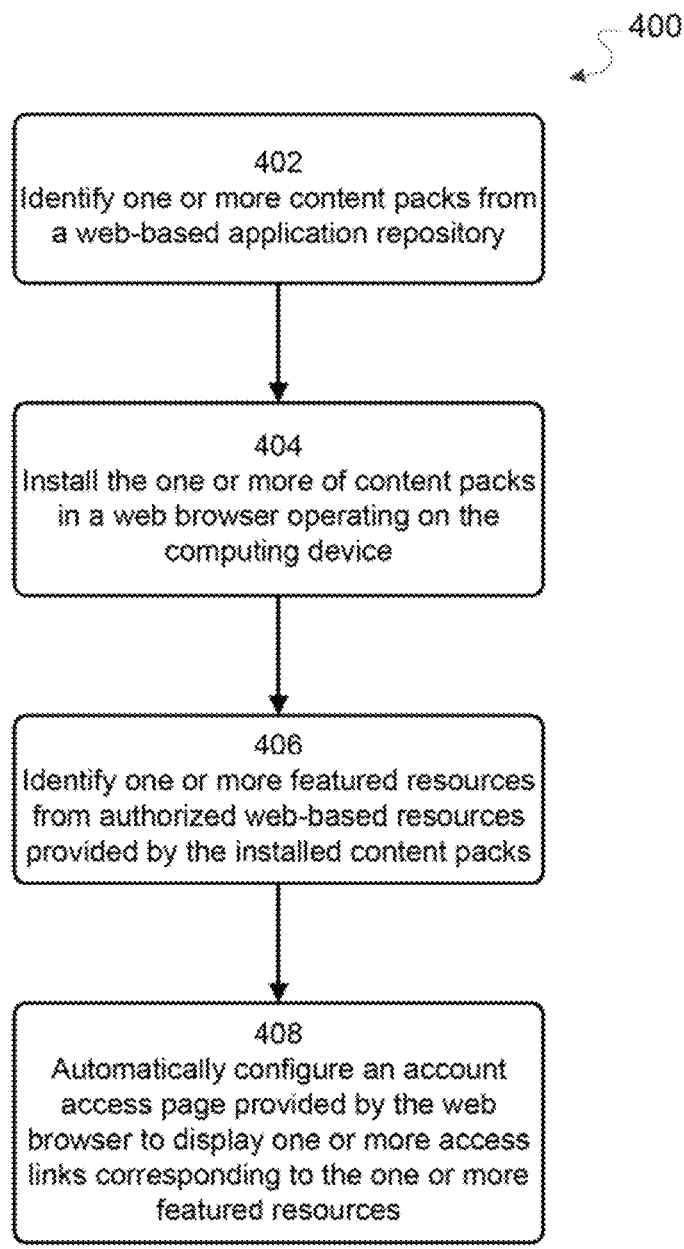
FIG. 4 illustrates a flow diagram of an example process for automatically providing a safe browsing environment for a supervised user.

FIG. 4 illustrates a flow diagram of an example process 400 for automatically providing a safe browsing environment for a supervised user according to one or more aspects of the subject technology. For explanatory purposes, example process 400 is described herein with reference to the various components and component data flows of FIGS. 1 to 3; however, example process 400 may also be applicable to other components and/or component data flows and process described herein. Further for explanatory purposes, the blocks of example process 200 are described herein as occurring in serial, or linearly. However, multiple blocks of example process 400 may occur in parallel. In addition, the blocks of example process 400 need not be performed in the order shown and/or one or more of the blocks of example process 400 need not be performed.

A web browser 108 may be configured with predetermined access controls (e.g., parental controls) that prevent the supervised user from browsing unauthorized content. For example, web browser 108 may be configured to prevent access to web-based resources (e.g., URLs, domain names, top-level domain names, hostnames, IP addresses, and/or web applications and/or browser extensions, and the like) not identified by one or more predetermined access control lists (e.g., whitelists) 112 installed in the web browser. In this regard, web browser 108 may be configured to block all web-based resources except web-based resources in a respective access control list 112. Web browser 108 may be configured to prevent the access to non-authorized web-based resources, for example, when a supervised user 110 is signed into the web browser. That is, supervised user 110 may have certain access privileges, while an account manager having higher access privileges than the supervised user may be designated as being responsible for managing and/or controlling content that the supervised user can access and/or view within the web browser.

Accordingly, web browser 108 may be configured to install content packs 114, with each content pack identifying a plurality of authorized web-based resources. In this regard, one or more content packs 114 are identified from a web-based application repository (402). In various implementations, the web-based application repository may be a virtual marketplace 106 providing a web interface for selecting and obtaining applications for download and installation. The one or more content packs 114 may be identified based on, for example, predetermined access controls assigned to supervised user 110 who is logged into an account used on web browser 108 and/or virtual marketplace 106.

The content packs may be identified by an account manager (on behalf of a supervised user), or by the supervised user. Supervised user 110 may access virtual marketplace 106 and select content packs 114 that the user is interested in. In this manner, virtual marketplace 106 may facilitate the sending of a request for permission to install the one or more content packs selected by the supervised user 110. Supervised user 110 sends the request and must wait until the request is approved by an account manager. The account manager grants the request, and virtual marketplace 106 receives an indication that the request has been granted before facilitating the download and/or installation of the one or more of the selected content packs in web browser 108.

The one or more of content packs 114 are installed in web browser 108 operating on the computing device (404). As described previously, each content pack 114 identifies a plurality of authorized web-based resources. In various implementations, content packs 114 are installed only when authorized by appropriate permissions. Accordingly, an account manager may log into web browser 108 and navigate to the web-based application repository and perform the download and installation, or may authorize supervised user 110 to perform the download and installation of content packs 114 predetermined by the account manager as being suitable for the supervised user.

In connection with the installation of the content packs, one or more featured items and/or resources are identified from authorized web-based resources provided by the installed content packs (406). In various implementations, a content pack 114 may include a list of resource identifiers such as web addresses, and each featured resource may be identified in the content pack by a web address marked with a descriptor tag 118. Each content pack 114 is processed by a software parser and/or interpreter within web browser 108. A parser may be implemented, for example, as a runtime JAVA parser. In this regard, web browser 108 is configured to recognize the resource identifier marked with the descriptor tag as requiring special processing. Additionally or in the alternative, one or more featured items and/or resources may be identified automatically, even though not identified by a descriptor tag 118. For example, no items may be designated as featured in an installed content pack 114. Accordingly, software instructions (e.g., parser or interpreter) within web browser 108 or computing device 102 may be configured to select a best-fit item (e.g., web address) based on predetermined patterns (e.g., including "/home.htm" or the like), or based on, for example, having a shortest signature (e.g., closest to a generic domain name). Featured items and/or resources may also be determined by other means. For example, information such as the supervised user's access patterns or interests, other installed content packs 114, or specific selections made by the account manager may also be used to select resources to be displayed on account access page 120.

When featured resources are identified, an account access page provided by web browser 108 is then automatically configured to display one or more access links corresponding to the one or more featured resources (408), with each featured resource providing a web-based entry point to one or more web-based resources made available by the installed one or more content packs 114. Account access page 120 may be implemented as a home page that is displayed when a new instance of the browser (or a tab of the browser) is opened, or a link or other control is activated to display the page. As described previously, account access page 120 may be accessed from a system tray of an operating system, or may include a grouping of one or more icons (e.g., each representing an entry point 122) displayed on a homescreen or desktop.

The interpreter may identify resource identifiers marked with descriptor tags and pass the identified resource identifiers to code within the browser that automatically builds and/or updates account access page 120. For example, account access page 120 may display access links provided from a particular extensible markup language (XML) document stored on computing device 102 and associated with account access page 120 and/or web browser 108. Accordingly, the XML document may be read and rendered for display by XML translation software operating on web browser 108 (or a server that provides the page to the web browser) when account access page 120 is generated for display by web browser 108. On installing or removing a respective content pack, the XML document may be updated with new entries, and the new entries automatically rendered for display in account access page 120 according to processes provided by XML translation software.

Each access link displayed by access control page 120 may be a hyperlink configured to initiate a browser navigation to a respective featured resource. In some implementations, the account access page may include one or more groups of access links, each group associated with a particular brand.

Many of the above-described features of process 400 and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
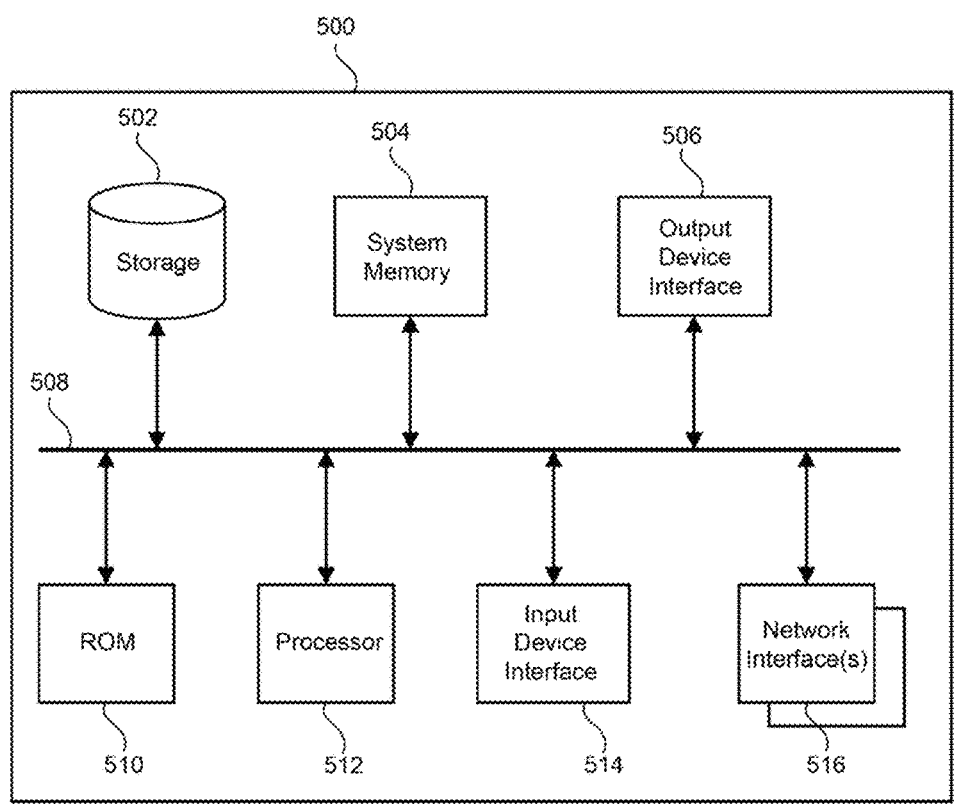
FIG. 5 is a diagram illustrating an example electronic system for use in connection with providing a safe browsing environment for a supervised user, according to one or more aspects of the subject technology.

FIG. 5 is a diagram illustrating an example electronic system 500 for use in connection with providing a safe browsing environment for a supervised user, according to one or more aspects of the subject technology. Electronic system 500 may be a computing device for execution of software associated with the operation of system 100, or one or more portions or components and processes provided by FIG. 1-3. In various implementations, electronic system 500 may be representative of computing device 102, server 104, database 202, content provider server 206, administrator device 302, or a different server, computer, phone, PDA, laptop, tablet computer, touch screen or television with one or more processors embedded therein or coupled thereto, or any other sort of electronic device.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 410, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi). Network interfaces 516 may also include hardware (e.g., Ethernet hardware) for connecting the computer to a part of a network of computers such as a local area network ("LAN"), a wide area network ("WAN"), or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component. e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   installing one or more content packs in a web browser operating on a computing device, a respective content pack identifying a plurality of authorized web-based resources comprising a web application, the web browser being configured to prevent access to web-based resources not identified by content packs installed in the web browser;
   identifying, by the web browser from among the plurality of authorized web-based resources in the respective content pack, one or more featured resources different from other web-based resources of the plurality of authorized web-based resources, each featured resource being identified in the respective content pack by an associated descriptor tag during a parsing of the respective content pack by the web browser when the respective content pack is installed; and
   automatically, by the web browser and in response to identifying the one or more featured resources from among the plurality of authorized web-based resources, configuring an account access page provided by the web browser with one or more access links corresponding to each of the one or more featured resources, each featured resource providing a web-based entry point to one or more of the other web-based resources made available by the installed respective content pack.

2. The computer-implemented method of claim 1, wherein each access link is a hyperlink configured to initiate a browser navigation to a respective featured resource.

3. The computer-implemented method of claim 1, wherein a content pack comprises a list of web addresses.

4. The computer-implemented method of claim 1, wherein the account access page comprises two or more groups of access links, each group associated with a particular brand.

5. The computer-implemented method of claim 1, further comprising:
identifying the one or more content packs from a web-based application repository based on predetermined access controls before installing the one or more content packs in the web browser.

6. The computer-implemented method of claim 5, wherein the web browser is configured to prevent access to web-based resources not identified by content packs installed in the web browser when a supervised user is identified as using the web browser, and wherein the predetermined access controls are not accessible by the supervised user but are managed by an account manager having higher access privileges than the supervised user.

7. The computer-implemented method of claim 5, further comprising:
sending to a server associated with a virtual marketplace, via the web browser, a request for permission to install the one or more content packs; and
receiving an indication that the request has been granted before installing the one or more content packs in the web browser.

8. The computer-implemented method of claim 7, wherein the request is granted by an account manager having authorization to set the predetermined access controls.

9. The computer-implemented method of claim 5, wherein the web-based application repository is a virtual marketplace providing a web interface for selecting and obtaining applications for download and installation.

10. The computer-implemented method of claim 1, wherein the web browser is configured to block all web-based resources except web-based resources in an access control list, the one or more content packs updating the access control list with web addresses corresponding to the authorized web-based resources upon being installed in the web browser.

11. The computer-implemented method of claim 1, wherein the content packs are automatically pushed to the web browser over a network from a remote location.

12. The computer-implemented method of claim 1, wherein the plurality of the authorized web-based resources further comprises a web browser extension.

13. A computer program product tangibly embodied in a computer-readable storage device and comprising instructions that, when executed by a computing device, cause the computing device to:
identify one or more content packs from a web-based application repository based on predetermined access controls;
install the one or more content packs in a web browser operating on the computing device, a respective content pack identifying a plurality of authorized web-based resources comprising a web application, the web browser being configured to prevent access to web-based resources not identified by content packs installed in the web browser;
identify, by the web browser from among the plurality of authorized web-based resources in the respective content pack, one or more featured resources different from other web-based resources of the plurality of authorized web-based resources, each featured resource being identified in the respective content pack by an associated descriptor tag during a parsing of the respective content pack by the web browser when the respective content pack is installed; and
automatically, by the web browser and in response to identifying the one or more featured resources from among the plurality of authorized web-based resources, configure an account access page to display one or more access links corresponding to each of the one or more featured resources, each featured resource providing a web-based entry point to one or more of the other web-based resources made available by the installed respective content pack.

14. The computer program product of claim 13, wherein each access link is a hyperlink configured to initiate a browser navigation to a respective featured resource.

15. The computer program product of claim 13, wherein a content pack comprises a list of web addresses.

16. The computer program product of claim 13, wherein the account access page comprises two or more groups of access links, each group associated with a particular brand.

17. The computer program product of claim 13, wherein the web browser is configured to prevent access to web-based resources not identified by content packs installed in the web browser when a supervised user is identified as using the web browser, and wherein the predetermined access controls are not accessible by the supervised user but are managed by an account manager having higher access privileges than the supervised user.

18. The computer program product of claim 13, wherein the instructions, when executed by the computing device, further causing the computing device to:
send to a server associated with a virtual marketplace, via the web browser, a request for permission to install the one or more content packs; and
receive an indication that the request has been granted before installing the one or more of the content packs in the web browser.

19. The computer program product of claim 18, wherein the request is granted by an account manager having authorization to set the predetermined access controls.

20. The computer program product of claim 13, wherein the web-based application repository is a virtual marketplace providing a web interface for selecting and obtaining applications for download and installation.

21. A system, comprising:
one or more processors; and
a memory including instructions that, when executed by the one or more processors, cause the one or more processors to facilitate the steps of:
install a content pack in a web browser operating on the system, the content pack identifying a plurality of authorized web-based resources comprising a web application, the web browser being configured to prevent access to web-based resources not identified by content packs installed in the web browser;
identify, by the web browser from among the plurality of authorized web-based resources in the content pack, one or more featured resources different from other web-based resources of the plurality of authorized web-based resources, each featured resource being identified in the content pack by an associated descriptor tag during a parsing of the content pack by the web browser when the content pack is installed; and
automatically, by the web browser and in response to identifying the one or more featured resources from among the plurality of authorized web-based resources, configure an account access page to display one or more access links corresponding to each of the one or more featured resources, each featured resource providing an entry point to one or more of the other web-based resources made available by the installed content pack.

* * * * *